E. F. PAWSAT.
HEAD FOR BICYCLE STANDS.
APPLICATION FILED JUNE 16, 1914.

1,114,028.

Patented Oct. 20, 1914.

UNITED STATES PATENT OFFICE.

EWALD F. PAWSAT, OF SHEBOYGAN, WISCONSIN, ASSIGNOR TO WALD MANUFACTURING COMPANY, OF SHEBOYGAN, WISCONSIN.

HEAD FOR BICYCLE-STANDS.

1,114,028.

Specification of Letters Patent.   Patented Oct. 20, 1914.

Application filed June 16, 1914.   Serial No. 845,436.

*To all whom it may concern:*

Be it known that I, EWALD F. PAWSAT, a citizen of the United States, and resident of Sheboygan, in the county of Sheboygan and State of Wisconsin, have invented certain new and useful Improvements in Heads for Bicycle-Stands; and I do hereby declare that the following is a full, clear, and exact description thereof.

My invention has for its object to provide a simple, effective and rigid stand for attachment to the rear forks of a bicycle or motorcycle, its construction and arrangement being such that a head is provided having a load-supporting arm carrying a lug adapted to extend under the lower rod member of the rear fork of a machine whereby the device will accommodate any type of rear fork and the strain of the load is thus transmitted to the fork member at a distance from the axis of the wheel, whereby rigidity is obtained.

My present invention is particularly designed as an improvement upon that form of bicycle stand shown and described in a patent issued to me April 14, 1914, No. 1093352.

With the above object in view the invention consists in certain peculiarities of construction and combination of parts as set forth hereinafter with reference to the accompanying drawings and subsequently claimed.

Figure 1:
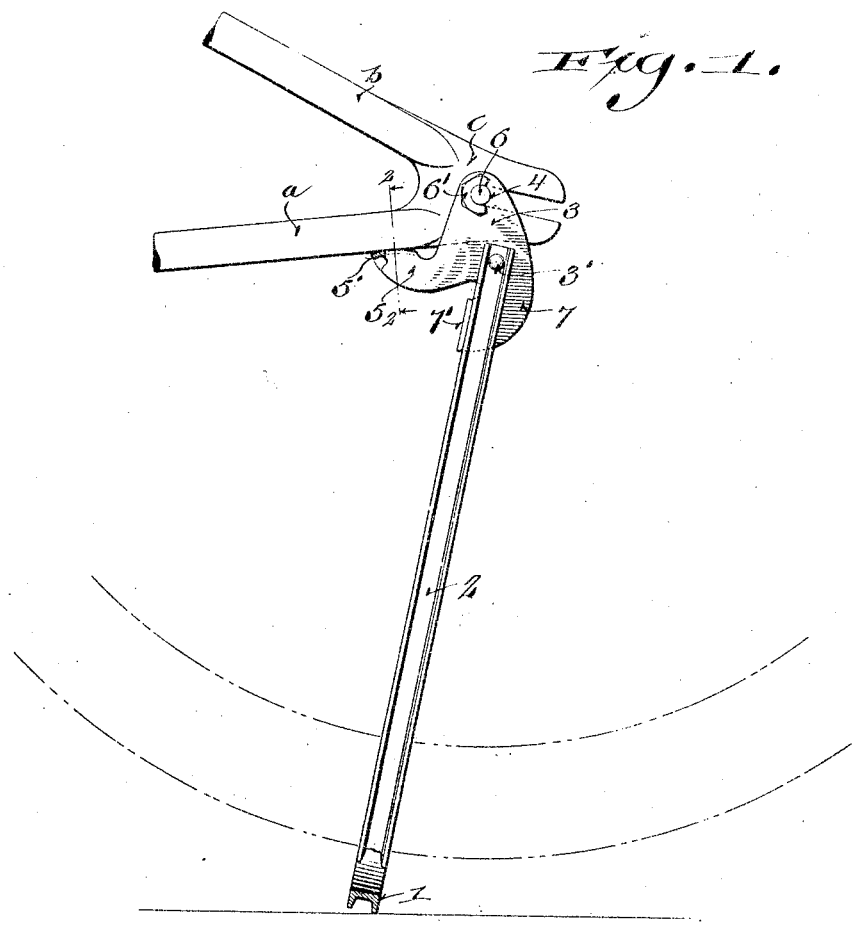
Figure 2:

In the drawings Figure 1 represents a side elevation of a stand embodying the features of my invention with parts broken away and in section to illustrate details of construction, the stand being shown attached to the rear fork of a bicycle or motorcycle frame, and Fig. 2, a cross-section through the lower fork member and a load-sustaining arm of the stand-supporting head, the section being indicated by line 2—2 of Fig. 1.

Referring by characters to the drawings, a supporting bail of the standard type is provided comprising a transversely arranged foot-board 1 having legs 2 bent upwardly therefrom, the said bail being preferably formed from a single piece of channel iron. The upper ends of the legs 1 are hinged to the body 3 by rivets 3', which rivets constitute pivot points for the stand, whereby it may be swung upward when not in use, or downward to the position shown in Fig. 1 when the vehicle is at rest, in which position the load is sustained by the stand. The head 3 is provided with an axle-receiving aperture 4, which aperture is disposed above and forwardly of the pivot-points of the legs, it being understood that there are two heads, each being connected to a leg of the stand.

Extending forwardly from the body portion of the head and upon a lower plane than the axle aperture thereof, is a load-supporting arm 5, which arm has extending inwardly therefrom a lug 5' that is adapted to engage the bottom side of the lower rod *a* of a rear fork, the said lower rod and its companion member *b* being connected by the usual slotted axle-receiving web *c*. The heads, as shown, are fitted to the web and secured by an axle bolt 6 which passes through the slots of the web and is clamped thereto by nuts 6' in the usual manner. The head 3 is also provided with a leg-sustaining arm 7, which arm projects below the axle aperture of the head and also below the pivot point of the stand legs 2. This arm carries an outwardly projecting leg-sustaining lug 7' which is arranged to abut one edge of its companion leg when the stand is swung down to its load-sustaining position, this sustaining lug, together with the load-sustaining lug 5' of the companion arm, being in advance of a vertical line drawn through the axle aperture of the head.

From the foregoing description it will be seen that the heads can readily be fitted to the webs of the companion forked members and the load-sustaining lug 5' will thus be caused to engage the bottom edge of the lower fork member A. By this arrangement no adjustment or fitting of the heads is required, it being apparent that they will automatically assume their correct positions relative to the load strain.

It is obvious that I may, in some instances, employ studs as a substitute for the integral lugs 5', 7', without departing from the spirit of my invention.

By this construction it is also apparent that when a stand is subjected to load strain there will be practically no tendency to spread the slotted end of the web *c* due to the fact that the load is bound and sustained by the axle and the load-sustaining lug 5' which is disposed at a considerable distance from the axle and upon a lower plane than the latter so as to engage the bottom side of the fork member *a*.

I claim:

A head for stands of the described character comprising a flat body portion provided with an axle-receiving aperture, and a leg pivoting aperture upon a lower plane than the axle aperture, a load-sustaining arm extending from the body portion forwardly of the same, a leg-sustaining arm extending from the body portion below the axle aperture and forwardly of the same, a load-sustaining lug extending inwardly from the end of the load-sustaining arm, a leg-sustaining lug extending outwardly from the leg-sustaining arm, each of said lugs being upon lower planes than the axle aperture and in advance of the same with reference to a vertical line extending therethrough.

In testimony that I claim the foregoing I have hereunto set my hand at Sheboygan in the county of Sheboygan and State of Wisconsin in the presence of two witnesses.

EWALD F. PAWSAT.

Witnesses:
W<small>M</small>. H. G<small>RUBE</small>,
A<small>RTHUR</small> A. N<small>ACK</small>.